(12) United States Patent
Yan et al.

(10) Patent No.: US 8,685,548 B2
(45) Date of Patent: Apr. 1, 2014

(54) LUBRICANT COMPOSITIONS

(75) Inventors: Xiaoping Yan, Pleasanton, CA (US);
Michael Joseph Stirniman, Fremont, CA (US); Jiping Yang, San Jose, CA (US); Wenhong Liu, San Jose, CA (US); Qian Guo, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 215 days.

(21) Appl. No.: 13/077,747

(22) Filed: Mar. 31, 2011

(65) Prior Publication Data
US 2012/0251843 A1    Oct. 4, 2012

(51) Int. Cl.
*G11B 5/66* (2006.01)

(52) U.S. Cl.
USPC .................. 428/835.8; 508/422; 508/582

(58) Field of Classification Search
None
See application file for complete search history.

(56) References Cited

U.S. PATENT DOCUMENTS

| | | | | |
|---|---|---|---|---|
| 4,671,999 A | * | 6/1987 | Burguette et al. | 428/835.8 |
| 5,225,549 A | | 7/1993 | Dekura | |
| 5,456,980 A | * | 10/1995 | Murakami et al. | 428/336 |
| 5,942,598 A | * | 8/1999 | Iwa et al. | 528/362 |
| 5,965,496 A | * | 10/1999 | Yamana et al. | 508/244 |
| 6,916,531 B2 | * | 7/2005 | Liu et al. | 428/336 |
| 7,459,415 B1 | | 12/2008 | Liu | |
| 7,956,020 B2 | * | 6/2011 | Negoro et al. | 508/258 |
| 2003/0138670 A1 | * | 7/2003 | Liu et al. | 428/695 |
| 2003/0207774 A1 | * | 11/2003 | Negoro et al. | 508/258 |
| 2006/0111251 A1 | | 5/2006 | Tonelli | |
| 2007/0032390 A1 | * | 2/2007 | Russo et al. | 508/257 |
| 2010/0118436 A1 | * | 5/2010 | Yan et al. | 360/97.02 |
| 2010/0136371 A1 | * | 6/2010 | Shimizu et al. | 428/833 |
| 2011/0117386 A1 | | 5/2011 | Li | |
| 2011/0143165 A1 | * | 6/2011 | Kobayashi et al. | 428/800 |
| 2012/0219826 A1 | * | 8/2012 | Li et al. | 428/800 |

FOREIGN PATENT DOCUMENTS

| | | |
|---|---|---|
| WO | WO/2009/066784 | 5/2009 |
| WO | WO/2009/122988 | 10/2009 |
| WO | WO/2010/027096 | 3/2010 |

OTHER PUBLICATIONS

Mori et al ("Effects of end groups of the tribochemical reactions of lubricants at head-disk interface," Tribology Letters, vol. 17, No. 2, Aug. 2004, pp. 317-325).*
English machine translation of JP 2000-260017, Japan, Sep. 2000.*
PCT/US2011/39406 Search Report and Written Opinion dated Nov. 18, 2011.
PCT/US2011/39406 International Preliminary Examination Report dated Oct. 10, 2013.

* cited by examiner

*Primary Examiner* — Holly Rickman
(74) *Attorney, Agent, or Firm* — Mueting Raasch & Gebhardt PA

(57) ABSTRACT

Compositions including one or more a central cores having a cyclic group, and a plurality of arms extending from the central cores, wherein the arms comprise perfluoropolyethers (PFPEs) or its derivatives. Methods of preparing the compositions are also provided. Methods of preparing storage media that incorporate the compositions therein are further provided.

2 Claims, 12 Drawing Sheets

$Rf = (CF_2CF_2CF_2O)n$ $n \geq 3$

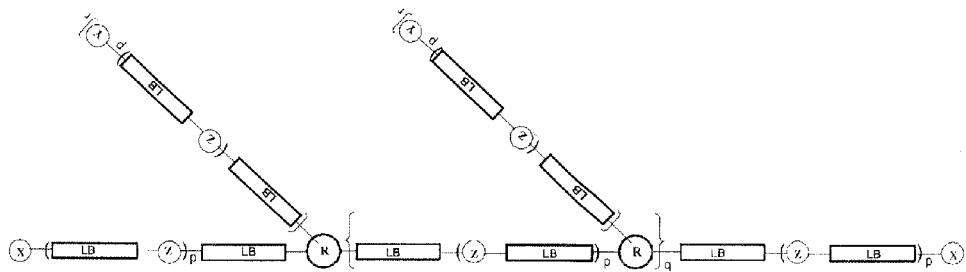

p = 0 ~7;   q = 0 ~5;   r = 0 (linear structure) or ≥ 1 (star-like structure)

LB:   -(C$_m$F$_{2m}$O)$_s$(C$_n$F$_{2n}$O)$_t$-, m ≥ 2;   n ≥ 1;   s = 1~1000, t = 0~1000} and its derivatives.

X or Y = -CH$_2$OH, -OCH$_2$CH$_2$OH, -CH$_2$CH(OH)CH$_2$OH, -C$_6$H$_5$, -CH$_2$CH(OH)CH$_3$, -CF$_3$, -CF$_2$CF$_3$, piperonyl and their derivatives.

Z = -C$_6$H$_4$-, -CH$_2$C$_6$H$_4$CH$_2$-, -CH$_2$CH(OH)CH$_2$-, -CH(OH)CH(OH)CH$_2$-, -CH(CH$_2$OH)-, -CH$_2$CH(OH)CH$_2$CH(OH)CH$_2$-, -CH(C$_6$H$_5$)-, -CH$_2$O, cyclotriphosphazenes, triazines and their derivatives.

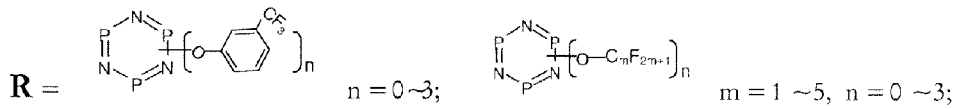

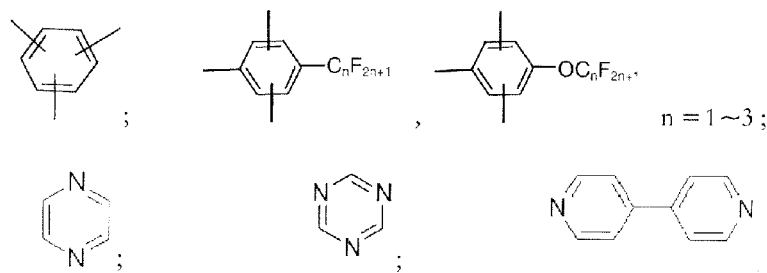

cyclohydrocarbon (C$_m$H$_{2m-n}$, m≥3, 2m>n ≥2) or its derivatives.

Fig. 1

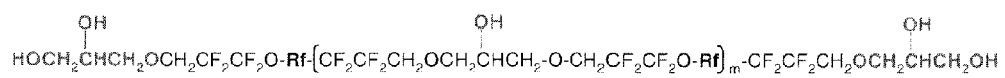
(a)
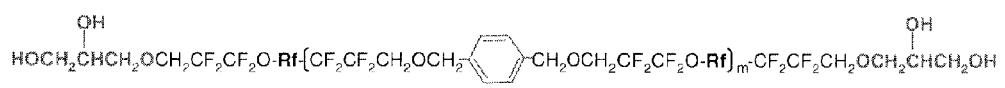
(b)
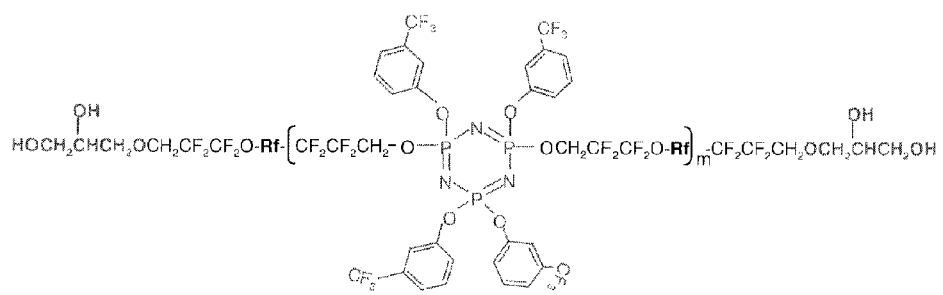
(c)
$m \geq 1$; $\mathbf{Rf} = (CF_2CF_2CF_2O)_n$, $n > 5$.
Fig. 2

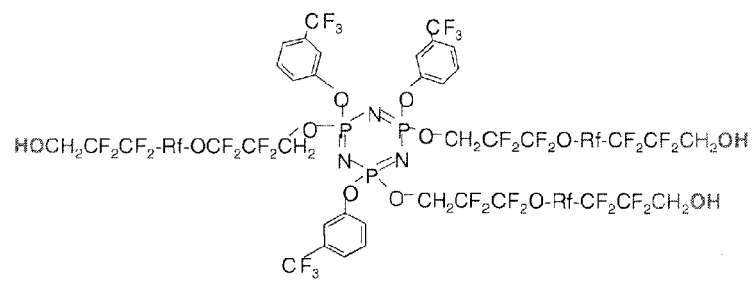
(a)
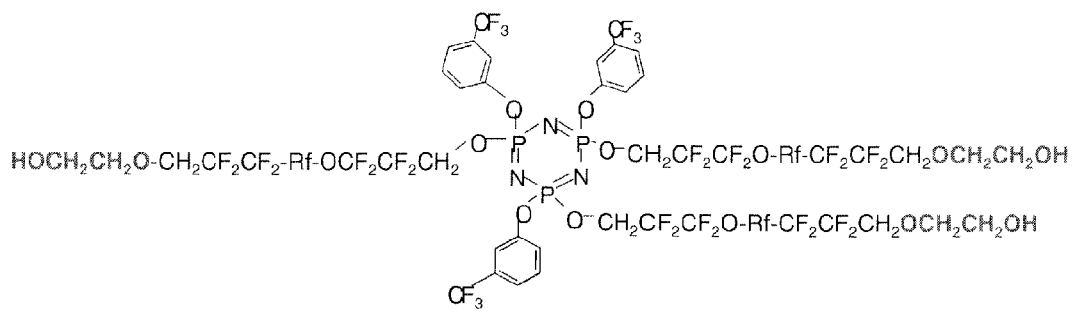
(b)
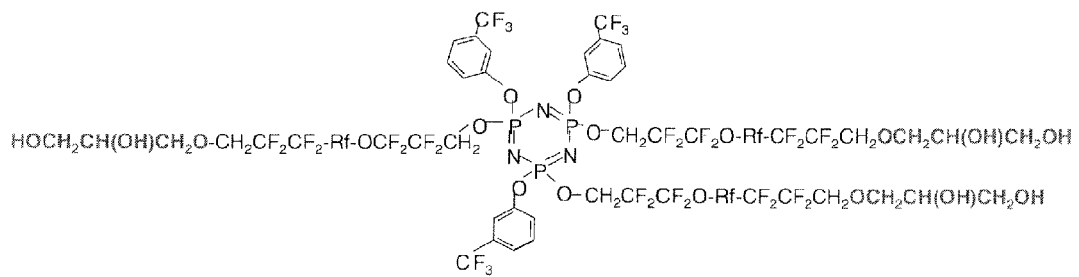
(c)
$Rf = (CF_2CF_2CF_2O)_n$, $n \geq 5$
Fig. 4

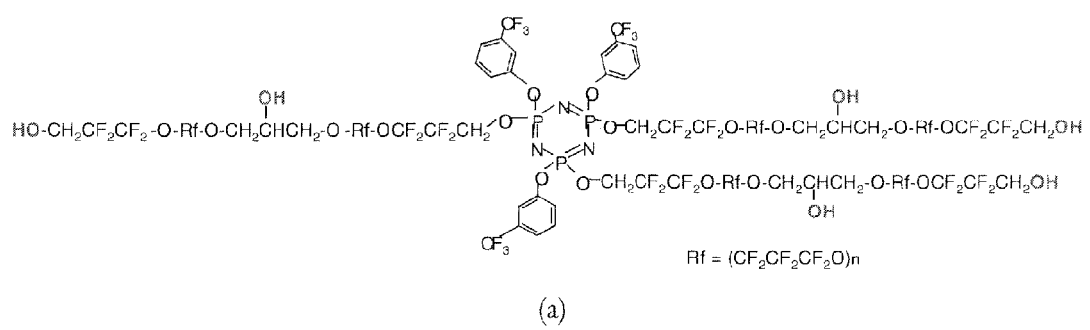
(a)
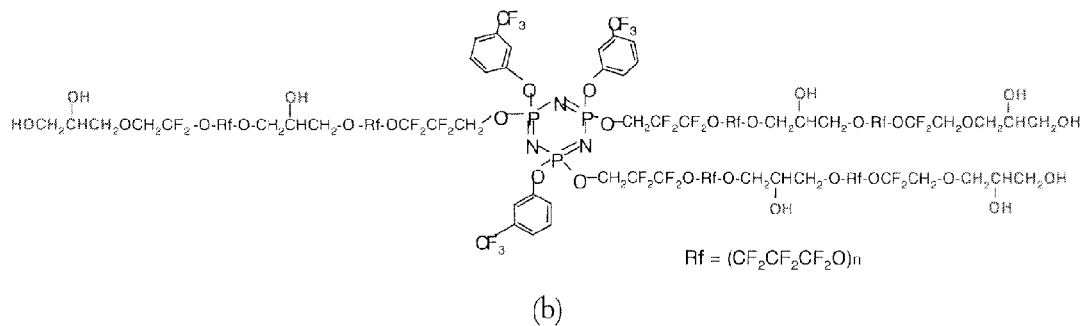
(b)
n ≥ 5
Fig. 5

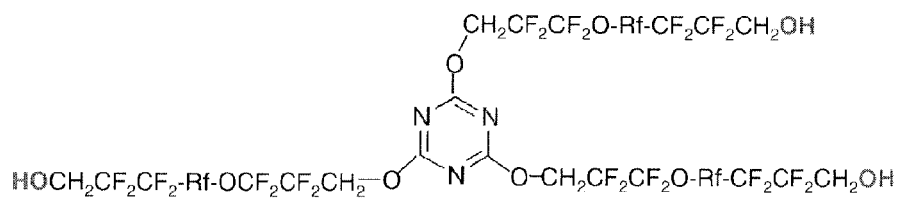
(a)
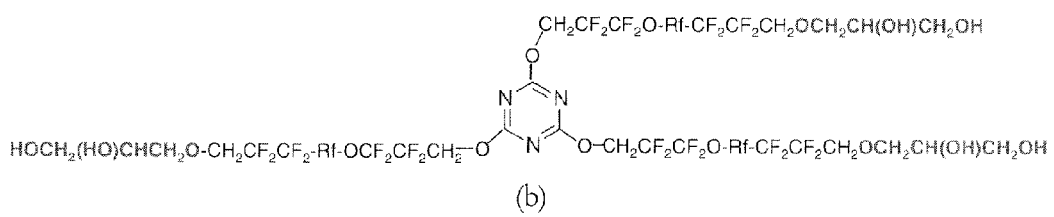
(b)
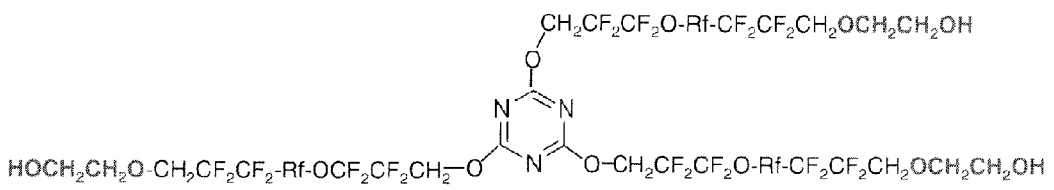
(c)
Rf = (CF$_2$CF$_2$CF$_2$O)$_n$, n ≥ 5
Fig. 8

LUBRICANT COMPOSITIONS

BACKGROUND

1. Field

The disclosure relates to compositions providing desirable triblogical properties, and providing the ability to achieve lower head media spacing (HMS) a well as providing desirable thermal robustness of head media interface.

2. Description of Related Art

With new recording technologies being developed, media lubricants currently being used cannot meet the unique requirements which are essential for the success of these advanced recording technologies. In the case of Energy Assisted Magnetic Recording (EAMR), where the disk surface is heated to a relatively high temperature, the current state-of-the-art media lubricants are unsuitable due to thermal material losses through evaporation and decomposition caused by the heating. Lubricant compositions proposed for EAMR have included high molecular weight non-functionally terminated linear perfluoropolyether (PFPE) lubricants such as high molecular weight (MW) poly(perfluorotrimethylene oxide). However, such high MW lubricants generally demonstrate poor reliability performance due to their large molecule profile and weak interaction with the carbon overcoat. Therefore, new media lubricants are desired to provide both thermal robustness and head/media interface reliability.

SUMMARY

In one aspect of the disclosure, a composition includes a central core including a cyclic group; and one or more arms extending from the central core, wherein the one or more arms include a perfluoropolyether or a perfluoropolyether derivative; wherein a number of arms extending from the central core is greater than one; wherein the number of arms extending from the central core is from one to six; wherein the central core is cyclotriphosphazene, triazine, benzene, diphenyl ether, polyphenyl ether, a cyclohydrocarbon or derivatives thereof; wherein the one or more arms include a lubricant backbone; wherein the lubricant backbone corresponds to the formula:

$$—(C_mF_{2m}O)_s(C_nF_{2n}O)_t—,\qquad\text{Formula 1}$$

where m is an integer ≥2 and n is an integer ≥1, s is an integer from about 1 to about 1000, and t is an integer from=0 to about 1000 or derivatives of Formula 1; wherein m is an integer from 2 to 7 and n is an integer from 1 to 7; wherein the one or more arms further include one or more terminal functional groups, wherein the one or more terminal functional groups are —$CH_2OH$, —$OCH_2CH_2OH$, —$CH_2CH(OH)CH_2OH$, —$C_6H_5$, —$CF_2CF_3$, —$CH_2CH(OH)CH_3$, —$CF_3$, —$OCH_2CH_2OCH_2CH_2OH$, piperonyl, triazine, cyclotriphosphazene or derivatives thereof; and wherein the one or more arms further include one or more non-terminal functional groups, wherein the one or more non-terminal functional groups are —$C_6H_4$—, —$CH_2C_6H_4CH_2$—, —$CH_2CH(OH)$ $CH_2$—, —$CH(OH)CH(OH)CH_2$—, —$CH_2CH(OH)CH_2CH$ $(OH)CH_2$—, —$CH(CH_2OH)$—, —$CH(OH)CH(OH)CH_2$—, —$CH(C_6H_5)$, triazine, cyclotriphosphazene or derivatives thereof.

In another aspect of the disclosure, a composition includes a plurality of central cores; and one or more arms extending from each of the plurality of central cores, wherein the one or more arms includes a perfluoropolyether or a perfluoropolyether derivative; and wherein at least one of the arms extends between two of the central cores; wherein the number of the central cores is two or three; wherein the number of arms extending from the central core is greater than one; wherein a number of arms extending from each one of the plurality of cores is from one to six; wherein a number of arms extending from each one of the plurality of cores is two; wherein at least one of the plurality of cores is cyclotriphosphazene, triazine, benzene, diphenyl ether, polyphenyl ether, a cyclohydrocarbon or derivatives thereof; wherein each of the plurality of cores is cyclotriphosphazene, triazine, benzene, diphenyl ether, polyphenyl ether, a cyclohydrocarbon or derivatives thereof; wherein the one or more arms include a lubricant backbone; wherein the lubricant backbone corresponds to the formula:

$$—(C_mF_{2m}O)_s(C_nF_{2n}O)_t—\qquad\text{Formula 1}$$

where m is an integer ≥2, n is an integer ≥1, s is and integer from about 1 to about 1000, t=is an integer from=0 to about 1000 or derivatives of Formula 1; wherein m is an integer from 2 to 7 and n is an integer from 1 to 7; and wherein the one or more arms further includes one or more terminal functional groups, wherein the one or more terminal functional groups are —$CH_2OH$, —$OCH_2CH_2OH$, —$CH_2CH(OH)CH_2OH$, —$C_6H_5$, —$CF_2CF_3$, —$CH_2CH(OH)CH_3$, —$CF_3$, —$OCH_2CH_2OCH_2CH_2OH$, piperonyl, triazine, a cyclotriphosphazene group or derivatives thereof; wherein the one or more arms further include one or more non-terminal functional groups, wherein the one or more non-terminal are —$C_6H_4$—, —$CH_2C_6H_4CH_2$—, —$CH_2CH(OH)CH_2$—, —$CH(OH)CH(OH)CH_2$—, —$CH_2CH(OH)CH_2CH(OH)$ $CH_2$—, —$CH(CH_2OH)$—, —$CH(OH)CH(OH)CH_2$—, —$CH(C_6H_5)$—, triazine, cyclotriphosphazene or a derivative thereof.

In a further aspect, an apparatus includes a substrate; a magnetic layer for recording information disposed on the substrate; a protective overcoat for protecting said magnetic layer; and a lubricant composition comprising a compound having a composition including a central core including a cyclic group; and one or more arms extending from the central core, wherein the one or more arms include a perfluoropolyether; wherein the lubricant composition has a thickness of from about 3 Å to about 50 Å; wherein the lubricant composition has a thickness of from about 0.5 nm to about 2 nm; and wherein the lubricant composition has a thickness of from about 10 Å to about 20 Å.

In a still further aspect, an apparatus includes a substrate; a magnetic layer for recording information disposed on the substrate; a protective overcoat for protecting said magnetic layer; and a lubricant composition including a compound having a composition including a plurality of cores; and one or more arms extending from each of the plurality of cores, wherein the one or more arms include a perfluoropolyether; and wherein at least one of the arms extends between two of the cores; wherein the lubricant composition has a thickness of from about 3 Å to about 50 Å.; wherein the lubricant composition has a thickness of from about 8 Å to about 40 Å.; and wherein the lubricant composition has a thickness of from about 10 Å to about 20 Å.

It is understood that other aspects of the present invention will become readily apparent to those skilled in the art from the following detailed description, wherein it is shown and described only in exemplary configurations of a compound and/or apparatus by way of illustration. As will be realized, the present invention includes other and different aspects of a compound and/or apparatus and its several details are capable of modification in various other respects, all without departing from the spirit and scope of the present composition.

Accordingly, the drawings and the detailed description are to be regarded as illustrative in nature and not as restrictive.

BRIEF DESCRIPTION OF THE DRAWINGS

Various aspects of the lubricant composition and apparatus are illustrated by way of example, and not by way of limitation, in the accompanying drawings, wherein:

FIG. 1 illustrates of the chemical structures of lubricant compositions, according to various aspects of the present invention;

FIGS. 2(a) and (b) illustrate the chemical structures of one embodiment in accordance of the present invention;

FIGS. 4(a)-(c) illustrate the chemical structures of a third embodiment in accordance of the present invention;

FIGS. 5(a) and (b) illustrate the chemical structures of a fourth embodiment in accordance of the present invention

FIGS. 8(a)-(c) illustrate the chemical structures of a seventh embodiment in accordance of the present invention;

DETAILED DESCRIPTION

Figure 3:
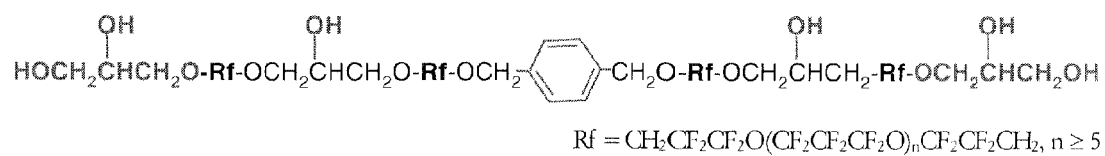
FIG. 3 illustrates the chemical structure of a second embodiment in accordance of the present invention.

The present invention is described more fully hereinafter with reference to the accompanying drawings, in which various aspects of the composition are shown. This composition, however, may be embodied in many different forms and should not be construed as limited to the various aspects of the present composition presented throughout this disclosure. Rather, these aspects are provided so that this disclosure will be thorough and complete, and will fully convey the scope of the present composition to those skilled in the art. The various aspects of the present composition illustrated in the drawings may not be drawn to scale. Rather, the dimensions of the various features may be expanded or reduced for clarity. In addition, some of the drawings may be simplified for clarity.

Various aspects of the present composition will be described herein with reference to drawings that are conceptual illustrations of idealized configurations of the present composition. As such, variations from the conceptual illustrations are to be expected in practice.

It will be understood that when an element such as a region, layer, section, or the like, is referred to as being "on" another element, it can be directly on the other element or intervening elements may also be present. It will be further understood that when an element is referred to as being "formed" on another element, it can be grown, deposited, etched, attached, connected, coupled, or otherwise prepared or fabricated on the other element or an intervening element.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

DEFINITIONS

All scientific and technical terms used in this application have meanings commonly used in the art unless otherwise specified. As used in this application, the following words or phrases have the meanings specified.

As used herein "perfluoropolyether" or "PFPE" means long chain polymers composed of repeat units of small perfluorinated aliphatic oxides such as perfluoroethylene oxide or perfluoropropylene oxide.

As used herein, "data zone" means a portion of the magnetic disk adapted to magnetically record information. The magnetic recording may occur via a slider of a magnetic head assembly which travels over the disk surface. The magnetic head assembly may comprise an air bearing read/write head. A "data zone" is a zone where the slider flies over the disk and stores magnetic data. The recording surface or data zone can be smooth or rough. The lubricant compositions are particularly suited for use with a disk having a smooth data zone. The smooth data zone may have a roughness average of less than about 15 Å, or a roughness average of less than about 10 Å.

As used herein, "landing zone" means a zone where the slider rests while the disk drive is off, and takes off from when the disk drive is started up.

As used herein, "backbone" means the main chain of the arms extending from the central core. Elements of the backbone may include carbon (C), fluorine (F), nitrogen (N), oxygen (O), or other elements.

As used herein, "functional group" means a substituent attached to the backbone that is capable of interacting with a surface to be lubricated.

As used herein, "terminal" means a functional group that is attached to the end of the backbone.

As used herein, "non-terminal" means a functional group that is not at the end of the backbone. A non-terminal functional group may be attached at any point or points along the backbone that are not terminal.

2. Compositions

In one aspect of the invention, a composition contains at least one central core comprising a cyclic group and one or more arms extending from the central core, wherein the one or more arms comprise a perfluoropolyether or a polyfluoropolyether derivative. In the embodiment shown if FIG. 1, the composition 10 includes a plurality of central cores 12 and a plurality of arms 14 extending from each of the plurality of the central cores, wherein at least one of the arms 16 extends between two of the central cores. In the embodiment shown in FIG. 1, there are two central cores, three arms extending from each of the central cores and one arm extending between the two central cores.

As seen in FIG. 1, the composition has a linear structure when r=0, i.e., when the number of arms 14 extending from each one of the plurality of central cores 12 is two; a star-like structure when q=0 and r≥1, i.e., when the number of central cores is two and the number of arms is one or more, and a bridged star-like structure when q≥1 and r≥1, i.e., when the number of central cores is greater than two and the number of arms is one or more.

Each arm 12 contains a perfluoropolyether 18 when z=0 or a polyfluoropolyether derivative when z≥1. As illustrated in FIG. 1, in some embodiments, the perfluoropolyether corresponds to the formula $$—(C_mF_{2m}O)_s(C_nF_{2n}O)_t—$$ Formula 1 where m is an integer from about 2 to about 7, n is an integer from about 1 to about 7, s is an integer from about 1 to about 1000, and t is an integer from=0 to about 1000 or derivatives of Formula 1. And in some embodiments, where m≥3 and/or n≥2, the lubricant compost ions are prevented from undergoing thermal, oxidative or Lewis acid-catalyzed decomposition.

The central core 12 is selected from a variety of cyclic groups including, but not limited to, cyclotriphosphazene, triazine, benzene, diphenyl ether, a polyphenyl ether, a cyclohydrocarbon and their derivatives. As illustrated in FIG. 1, in some embodiments, the one or more arms 14 additionally contain at least one terminal functional group 20 and 22 or a non-terminal functional group 24 to create a flatter conformation of the arm due to the bonding between functional groups and a media overcoat. Suitable non-terminal functional groups, include, but are not limited to, —$C_6H_4$—, —$CH_2C_6H_4CH_2$—, —$CH_2CH(OH)CH_2$—, —CH(OH)CH(OH)$CH_2$—, —$CH_2CH(OH)CH_2CH(OH)CH_2$—, —CH($CH_2OH$)—, —CH(OH)CH(OH)$CH_2$— and —CH($C_6H_5$)—, —$CH_2O$—, cyclotriphosphazenes, triazines and the like. Suitable terminal functional groups, which can be the same or different, include, but are not limited to, —$CH_2OH$, —$OCH_2CH_2OH$, —$CH_2CH(OH)CH_2OH$, —$C_6H_5$, —$CH_2CH(OH)CH_3$, —$CF_3$, —$CF_2CF_3$, —$OCH_2CH_2OCH_2CH_2OH$, piperonyl, cyclotriphosphazenes and triazines or their derivatives.

The molecular weight of the composition is typically in the range of from about 2000 to about 30000 g/mol. Compositions having molecular weights greater than 4000 g/mol can be chosen in order to prevent evaporation in the applications that need to be performed under high temperature, such as EAMR or other technologies.

As illustrated in FIG. 1, a composition 10 having a linear chemical structure includes one or more central cores 12, which can be the same or different, each bearing two arms 14, with one of the arms 16 extending between each of the central cores. In some embodiments, a non terminal functional group 24 bridges each adjoining perfluoropolyether 18 in each arm, while a terminal functional group 20 or 22 terminates perfluoropolyether at each end.

As shown in FIG. 1, a composition 10 having a star-like chemical structure includes a central core 12 bearing three arms 14. In some embodiments, a non terminal functional group 24 bridges each adjoining perfluoropolyether 18 in each arm, while a terminal functional group 20 or 22 terminates the perfluoropolyether at each end.

As shown in FIG. 1, a composition 10 having a bridged star-like structure includes two or more central cores 12, which may be the same or different, each bearing two arms 14, with an arm 16 extending between each of the central cores. In some embodiments, a non terminal functional group 24 bridges each adjoining perfluoropolyether 18 in each arm, while a terminal functional group 20 or 22 terminates the perfluoropolyether at each end.

The central cores 12 not only bear multiple arms to form low profile lubricant compositions, but also to provide thermal stability to the lubricant compositions, either as a Lewis base in the case of cyclotriphosphazene or triazine when the lubricant composition is brought in contact with Lewis acids, or as an ultra-violet (UV) active site to further enhance lubricant bonding to a carbon overcoat in the case of benzene.

The compositions are liquids that can be coated on, for example, a magnetic recording disks via conventional dip-coating techniques. An acceptable lubricant film thickness may be in the range of from about 3 Å to about 50 Å, and in some embodiments, from about 8 Å to about 40 Å and in some embodiments from about 10 Å to about 20 Å on the media surfaces, which may be achieved by controlling the concentration of the lubricant solution and/or controlling the pull-out speed. The lubricant composition may also be coated on the media surface via a vapor deposition process or a suitable spray technique. After the lubricant compositions are applied on the media surface, thermal or other surface treatments such as, for example, e-beam, gamma, UV and infra-red (IR) irradiation, may be conducted to further optimize the performance of the lubricant compositions.

3. Methods for Lubricating, and Apparatus Incorporating the Composition

The apparatus incorporating the lubricant composition, such as a recording medium, includes a lubricant layer formed from the compositions. Methods of lubricating an apparatus, such as a recording media, may incorporate the compositions. The methods generally comprise applying the compositions to the apparatus as the apparatus is formed.

The durability and reliability of the recording media can be achieved via the application of a protective overcoat, such as a carbon overcoat, as well as the lubricant composition. As the thickness of the carbon overcoat and lubricant composition is reduced, greater integration of the overcoat and lubricant composition is often desired to provide a more durable protective film. The conformation of the lubricant composition on the carbon overcoat is also of importance to the head-media spacing (HMS). In addition, lubricant compositions that extend their molecular structure across the surface of the carbon overcoat are able to cover the entire overcoat surface better than those that tend to extend their molecular chains away from the carbon surface.

The lubricant composition is applied evenly over the recording media in a thin film having a thickness from about 3 Å to about 50 Å, and in some embodiments in the range of about 5 Å to about 40 Å and in some embodiments in the range of about 10 Å to about 20 Å. The lubricant layer may also be made very thin, for example as thin as possible, while still retaining the durability and flyability needed to provide a functional recording medium. As will be understood by those skilled in the art, the selection of the thickness of the lubricant layer may depend on interactions between the recording media and the head assembly, such as the static friction, or "stiction," force on the slider, air shear, and the tendency of the lubricant composition to evaporate. The amount of lubricant on the data zone may also minimize wear and damage to the disk caused by occasional contacts between the magnetic head assembly and the disk.

The lubricant composition may be applied to either or both of the landing zone and the data zone of a recording medium. The lubricant composition may be applied as an unbonded layer having a thickness of about 3 Å to about 50 Å. In some embodiments, the lubricant composition may also be applied in a bonded layer having a thickness of about 3 Å to about 50 Å. The amount of lubricant on the landing zone may be chosen to minimize stiction forces on the slider. The amount of lubricant on the data zone may also be chosen to minimize wear and damage to the recording media caused by occasional contacts between the magnetic head assembly and the recording media.

Apparatus incorporating the recording media are adapted to magnetically record information via an air bearing read/write head. The apparatus may be a computer disk drive. Those skilled in the art will appreciate that the lubricant composition and methods of preparing recording media using the lubricant composition can be incorporated into methods for manufacturing disks and disk drives, such as thin film magnetic disks and disk drives. In accordance with these methods, more durable, higher-density recording media may be provided.

These and other aspects of the composition are further described in the non-limiting Examples set forth below.

EXAMPLE 1

FIGS. 2(a) and (b) depict low profile linear structure lubricant compositions 10. As shown in FIG. 2, various groups can be used as one or more central cores 12 to form a linear structure lubricant composition with multiple non-terminal functional groups 24 bridging perfluoropolyether 18 that also include terminal functional groups 20. The central cores employed in this example are benzene (FIG. 2(a)), and cyclotriphosphazene (FIG. 2(b)), respectively. Poly(perfluorotrimethylene oxide) ("Demnum") is chosen as the perfluoropolyether to enhance thermal stability and is employed as a representative perfluoropolyether 18. Lubricant compositions 2(a)-(c) may be referred to as high temperature linear low profile lubricant (HTLLPL).

EXAMPLE 2

FIG. 3 depicts a linear chemical structure of a composition 10 including a benzene central core 12. As shown in FIG. 3, a double hydroxyl group (Tetraol end groups) is employed as the terminal functional group 20 to terminate the poly(perfluorotrimethylene oxide) perfluoropolyethers 18 at both ends of the linear structure, and poly(perfluorotrimethylene oxide) and methylene oxide are employed as a non-terminal functional groups 16 extending between central cores.

EXAMPLE 3

FIGS. 4(a)-(c) depict lubricant compositions 10 having a star-like chemical structure consisting of a cyclophosphozene center core 12 bearing three poly(perfluorotrimethylene oxide) perfluoropolyethers 18 terminated with various terminal functional end groups 20 according to one aspect of the present invention, where n≥3. This lubricant composition may be referred to as high temperature star-like lubricant (HTSL).

EXAMPLE 4

FIGS. 5(a) and (b) depict a low profile star-like lubricant compositions 10 consisting of a cyclotriphosphazene center core 12 bearing three poly(perfluorotrimethylene oxide) perfluoropolyethers 18 bridged with non-terminal functional end groups 16, a single-OH group is located in the middle of each non-terminal functional end group.

EXAMPLE 5

Figure 6:
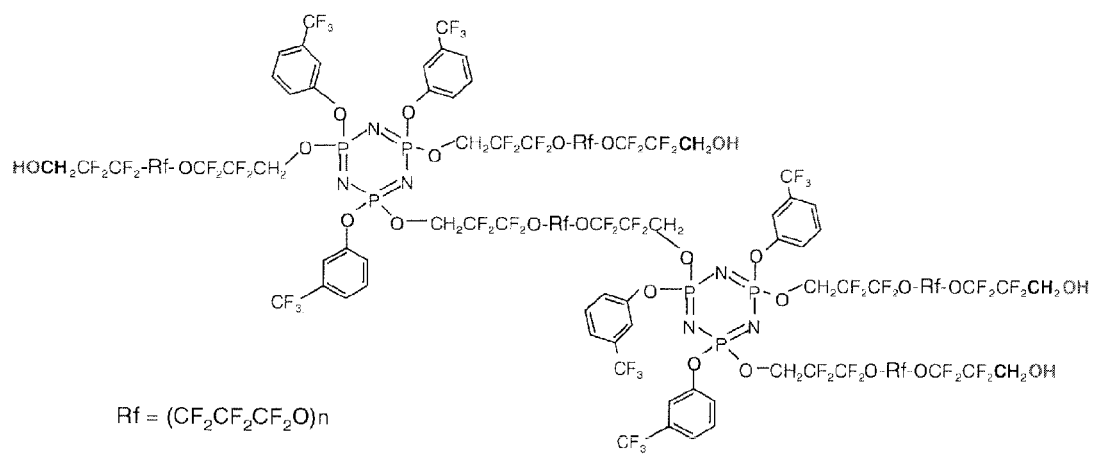
FIG. 6 illustrates the chemical structure of a fifth embodiment in accordance of the present invention.

FIG. 6 depicts a bridged-star-like lubricant composition 10. This structure includes two cyclotriphosphazene center cores 12, each bearing two functionally terminated arms 14, wherein poly(perfluorotrimethylene oxide) perfluoropolyether is used as the non-terminal functional group 16 to bridge the two central cores. This lubricant composition may be referred to as high temperature bridged star-like lubricant (HTbSL)

EXAMPLE 6

Figure 7:
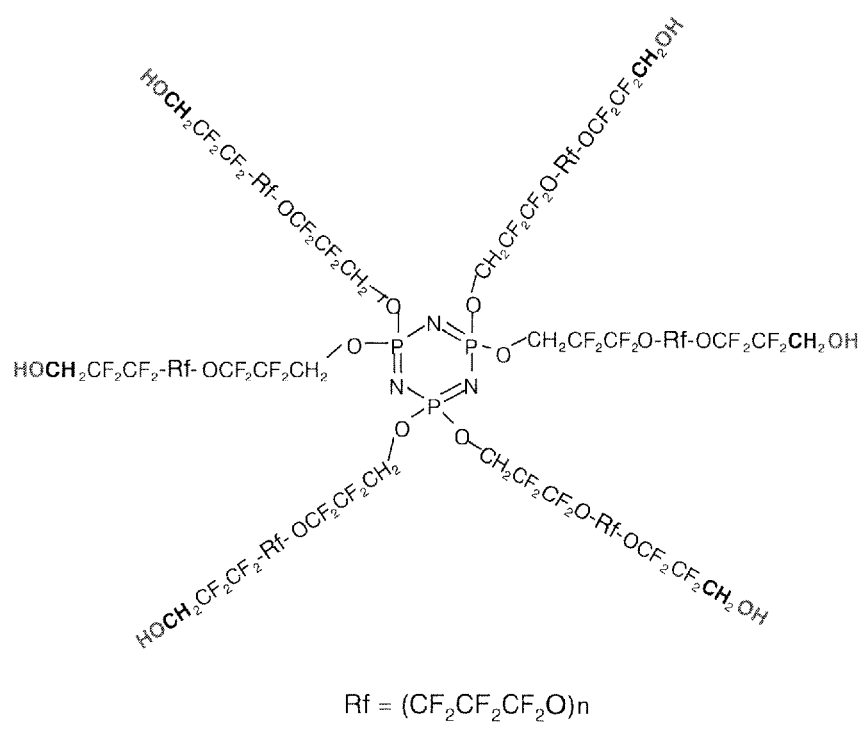
FIG. 7 illustrates the chemical structure of a sixth embodiment in accordance of the present invention.

FIG. 7 depicts a star-like lubricant composition 10 with six arms 14 extending from a single central core 7.

EXAMPLE 7

FIGS. 8(a)-(c) depict lubricant compositions 10 having a star-like chemical structure consisting of a triazine center core 12 and three arms 14 comprised of terminal functional groups 20 on each of three poly(perfluorotrimethylene oxide) perfluoropolyethers.

EXAMPLE 8

Figure 9:
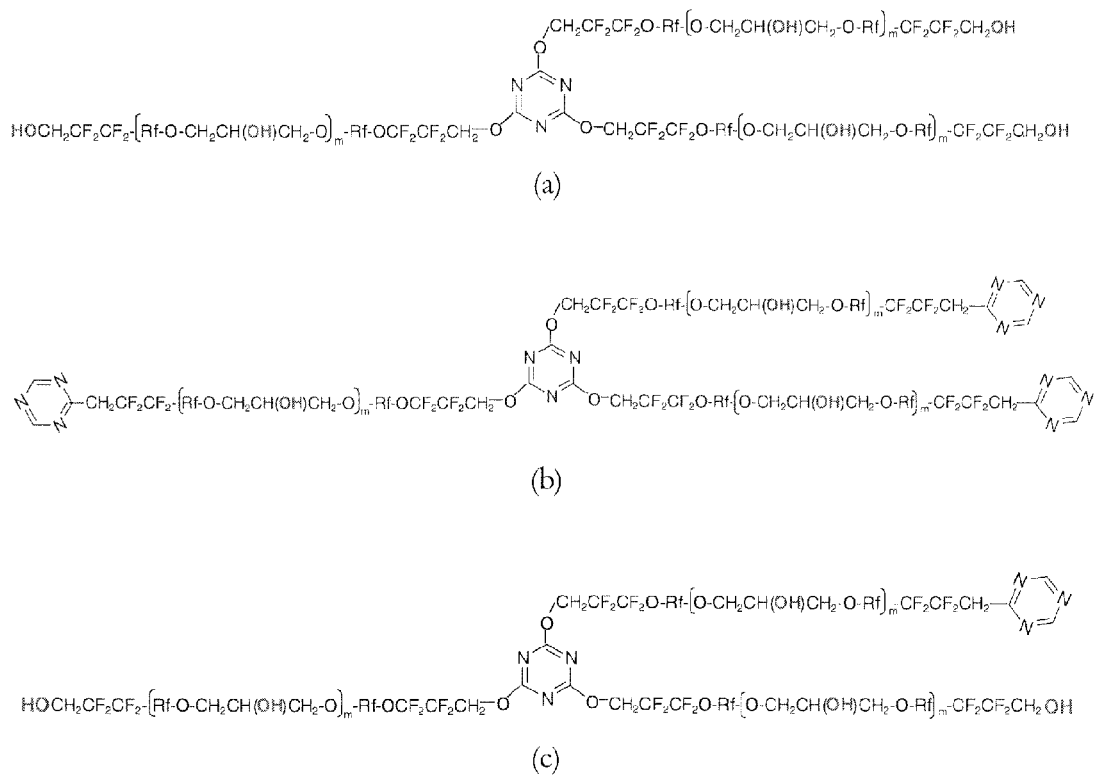
FIGS. 9(a)-(c) illustrate the chemical structures of an eighth embodiment in accordance of the present invention.

FIGS. 9(a)-(c) depict the chemical structures of low profile star-like lubricant compositions 10 consisting of a triazine central core 12 bearing three arms having both terminal 20 and non-terminal 24 functional groups

EXAMPLE 9

Figure 10:
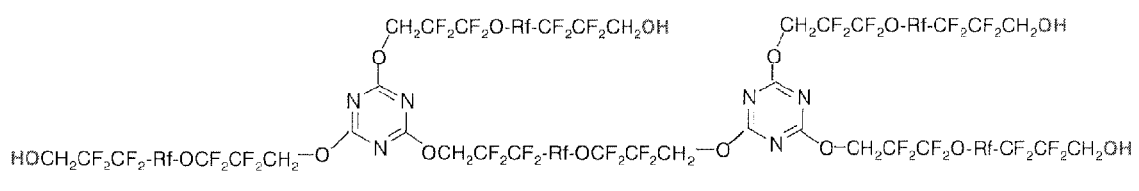
FIG. 10 illustrates the chemical structure of a ninth embodiment in accordance of the present invention.

FIG. 10 depicts the chemical structure of a bridged star-like lubricant composition 10 consisting of two triazine central cores 12 and two functionally terminated poly(perfluorotrimethylene oxide) arms 14 extending from each of the central cores, with one non-terminal poly(perfluorotrimethylene oxide) perfluoropolyether 18 extending between two central cores.

EXAMPLE 10

Figure 11:
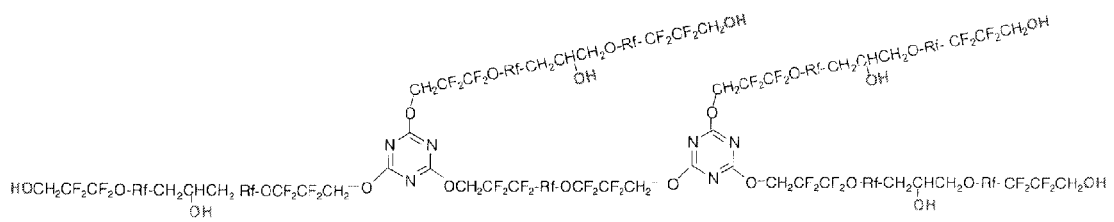
FIG. 11 illustrates the chemical structures of a tenth embodiment in accordance of the present invention.

FIG. 11 depicts the chemical structure of a low profile bridged star-like lubricant composition 10, including two triazine central cores 12 and two functionally terminated poly(perfluorotrimethylene oxide) arms 14 extending from each of the two central cores, with a single —OH group located in the middle of each non-terminal functional group 16.

Both HTSL (example 4, FIG. 4(a)) and HTbSL (Example 5) are synthesized and evaluated in terms of thermal stability and reliability. Experiments with a number of thermal analysis techniques including TGA and Temperature programmed desorption (TPD) and Rapid thermal processing (RTP) demonstrate that HTSL and HTbSL may be significantly more thermally stable than conventional hard disk lubricants (e.g. Fomblin Ztetraol, Zdol and the like). HTSL and HTbSL may also provide desirable reliability performance when compared with conventional hard disk lubricants, especially at low clearance. In addition, the lubricant compositions may provide desirable corrosion resistance and surface contamination resistance when compared with conventional media lubricants.

Figure 12:
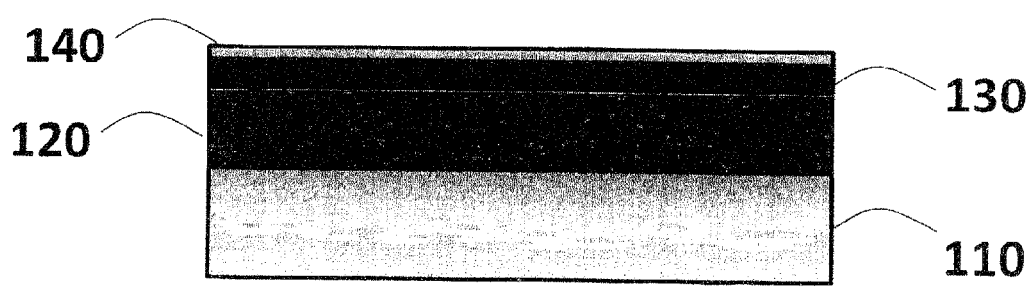
FIG. 12 is an illustration of an apparatus according to various aspects of the present invention.

FIG. 12 is an illustration of an apparatus including a substrate 110, a magnetic layer 120 on the substrate, and a protective overcoat 130 on the magnetic layer, to protect the magnetic layer. A lubricant layer 140 is disposed on the protective overcoat, to provide a low profile. The lubricant layer has a thickness of from about 3 Å to about 50 Å, and in some embodiments from about 8 Å to about 40 Å, and in some embodiments from about 10 Å to about 20 Å.

In some embodiments, the lubricant composition includes a compound having a composition comprising a central core comprising a cyclic group and one or more arms extending from the central core, wherein the one or more arms comprise a perfluoropolyether. In alternative embodiments, the lubricant composition includes a compound having a composition comprising a plurality of central cores and one or more arms extending from each of the plurality of central cores, wherein the one or more arms comprise a perfluoropolyether; and wherein at least one of the arms extends between two of the central cores.

The various aspects presented throughout this disclosure are provided to enable one of ordinary skill in the art to make and use the present composition. Various changes, alterations, and modifications to the compounds and apparatus presented throughout this disclosure will be readily apparent to those skilled in the art, and the concepts disclosed herein may be extended to other compounds and apparatus. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A composition comprising:
one or more compounds selected from:

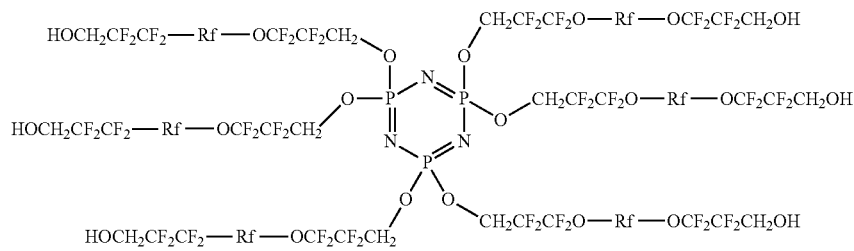

$Rf=(CF_2CF_2CF_2O)n$ wherein n is greater than or equal to 3.

2. An apparatus, comprising:
a substrate;
a magnetic layer for recording information disposed on the substrate;
a protective overcoat for protecting said magnetic layer; and
a lubricant composition comprising one or more compounds selected from:

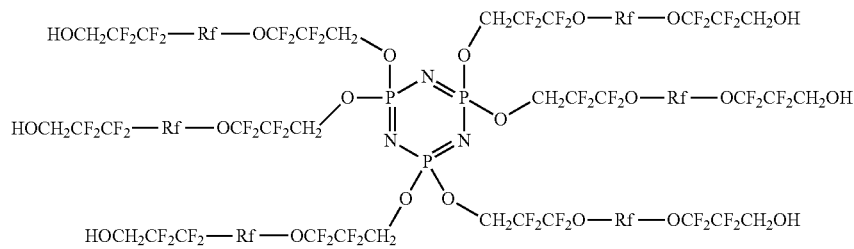

$Rf=(CF_2CF_2CF_2O)n$ wherein n is greater than or equal to 3.

* * * * *